US006717320B2

(12) United States Patent
Adachi et al.

(10) Patent No.: US 6,717,320 B2

(45) Date of Patent: Apr. 6, 2004

(54) ELECTRICAL CONNECTION DEVICE

(75) Inventors: Hideki Adachi, Shizuoka-ken (JP); Kazuto Nakamura, Shizuoka-ken (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 10/292,437

(22) Filed: Nov. 13, 2002

(65) Prior Publication Data

US 2003/0102766 A1 Jun. 5, 2003

(30) Foreign Application Priority Data

Nov. 14, 2001 (JP) .................................... P 2001-348955

(51) Int. Cl.[7] ......................... H01R 39/00; H01R 39/08

(52) U.S. Cl. .......................................... 310/232; 439/22

(58) Field of Search ............................... 439/15, 21–27, 439/29; 310/232

(56) References Cited

U.S. PATENT DOCUMENTS 2,981,916 A * 4/1961 O'Brien ....................... 439/22
3,544,949 A * 12/1970 Panasjuk et al. .............. 439/22
4,850,881 A * 7/1989 Lagier et al. ................. 439/22
5,470,236 A * 11/1995 Wissler ....................... 439/12
5,690,498 A * 11/1997 Sobhani ....................... 439/22
6,428,325 B1 * 8/2002 Kurosawa et al. ............ 439/21

FOREIGN PATENT DOCUMENTS

JP 6-215842 5/1994 ........... H01R/39/00

* cited by examiner

*Primary Examiner*—Burton Mullins

(74) *Attorney, Agent, or Firm*—Finnegan, Henderson, Farabow, Garrett & Dunner, L.L.P.

(57) ABSTRACT

The slip ring device (10) includes stationary and rotary members (11, 20) rotatable to each other. The slip ring device includes a sliding contact system for electrically interconnecting the stationary and rotary members. The sliding contact system includes slip rings (30, 31) with sliding faces (**34*a*, 35*a*) mounted to one of the stationary and rotary members. The slip rings are separated from each other, with the sliding faces facing each other. The sliding contact system includes sliding contact members (17, 18**) mounted to the other of the stationary and rotary members. Each of the sliding contact members slidably contact with each of the sliding faces.

9 Claims, 6 Drawing Sheets

111
111b
111c
121b
112
120
121
122
W
124
123
123a
134
116
119
133a
135
133
115b
121a
115a
118
118a
112a
113a
117a
117
125
126
126a
141
115
113b
113
114
A2
114a
B2
111a
140
UPWARD
DOWNWARD

ELECTRICAL CONNECTION DEVICE

BACKGROUND OF THE INVENTION

The present invention relates to a slip ring device (electrical connection device), preferably serving as an electrically conductive device, which electrically connects, for example, between a steering wheel and column for a vehicle. This device allows electrical connection between a stationary member and a rotary member rotatable relative to each other, with a pair of slip rings and a sliding contact adapted for great current slidably contacting each other.

A slip ring device includes a slip ring. The slip ring includes an insulative annular ring base. The slip ring includes large and small annular electrical conductive rings, which are concentric circles on an identical plane with different diameters. The rings serve as two circuits. Respective rings contact corresponding sliding contacts for electrical connection.

Art in relation to this slip ring is disclosed in Japanese Patent Application Laid-Open Publication No.Hei6-215842.

SUMMARY OF THE INVENTION

The arrangement of the conductive rings is essential not only regarding the width size of each of the conductive rings, but also for clearance between the conductive rings. The arrangement causes the large radial size of the slip ring. The adaptation of the slip rings to the slipping device produces a large-sized slip ring device.

The invention is directed to a slip ring device, which includes a pair of slip rings facing each other, thus achieving a small radial size.

The first aspect of the invention is directed to a slip ring device. The device includes stationary and rotary members rotatable to each other. The slip ring device includes a sliding contact system for electrically interconnecting the stationary and rotary members. The sliding contact system includes slip rings with sliding (slip) faces mounted to one of the stationary and rotary members. The slip rings are separated from each other, with sliding faces facing each other. The sliding contact system includes sliding contact members mounted to the other of the stationary and rotary members. Each of sliding contact members slidably contact with each of the sliding faces.

Preferably, at least one of the slip rings includes a ring base with a recess. A slip ring includes a conductive ring housed in the recess. The slip ring includes a locking part mounted to the ring base for locking with the conductive ring. The slip ring includes a pressing part provided to the one of the stationary and rotary members for pressing the locking part on the conductive ring.

Preferably, the conductive system includes a mounting member with first and second sides opposite to each other, mounted to the other of the stationary and rotary members and between the slip rings. The first side has one of the sliding contact members mounted thereto. The second side has an other of the sliding contact members mounted thereto.

The second aspect of the invention is directed to a sliding contact device. The device includes first and second base members rotatable relative to each other for establishing an angle threrebetween. The device includes a sliding contact system for electrically connecting between the first and second base members. The sliding contact system includes first and second sliding contacts axially arranged relative to each other.

Preferably, a first sliding contact includes a first conductive member mounted to the first base member. The first sliding contact includes a first mating member mounted to the second base member for slidably contacting with the first conductive member. The second sliding contact includes a second conductive member mounted to the first base member and facing the first conductive member. The second sliding contact includes a second mating member mounted to the second base member for slidably contacting with the second conductive member.

Preferably, the sliding contact system includes amounting member mounted to the second base member between the first and second conductive members. The mounting member has the first mating member on one side and the second mating member on the opposite side.

Preferably, one of the first and second conductive members includes a slip ring.

Preferably, one of the first and second mating members includes a resilient member.

BRIEF DESCRIPTION OF THE ACCOMPANYING DRAWINGS

DETAILED DESCRIPTION OF THE PREFERRED EMBODIMENTS

Embodiments of the invention will hereby be described with reference to the drawings.

First Embodiment

Figure 1:
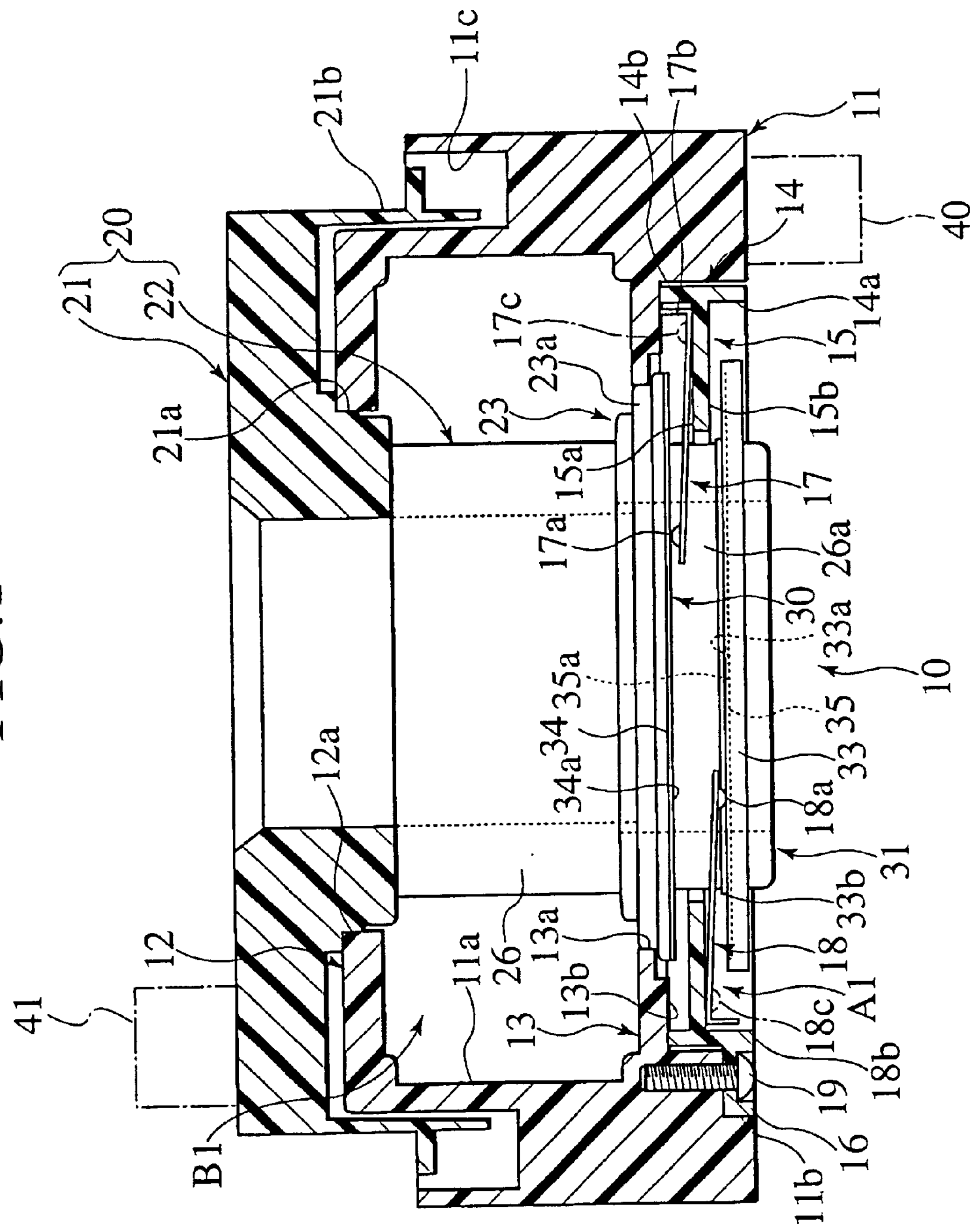
FIG. 1 is a sectional view of the first embodiment according to a slip ring device of the invention.

As shown in FIG. 1, a slip ring device 10 includes an insulative stationary member 11, which is mounted to, for example, a steering column. Device 10 includes a rotary member 20 mounted to a steering wheel. Rotary member 20 is rotatably supported to stationary member 10.

Slip ring device 10 includes a pair of slip rings 30, 31 mounted to rotary member (one side) 20, with respective sliding faces 34*a*, 35*a*. Stationary member (the other side) 11 includes a pair of sliding contacts 17, 18, each of which slidably contacts with each of the sliding faces 34*a*, 35*a*. The sliding contact establishes an electrical connection between stationary member 11 and rotary member 20 rotatable relative to each other. Specifically, device 10 allows a large current to be supplied from stationary member 11 (a steering column side) to a heater, housed within the steering wheel, through rotary member 20 rotatable together with the steering wheel.

In FIG. 1, stationary member 11 is formed of a synthetic resin into a thick cylindrical shape. Stationary member 11 has an upper end, from which circular upper flange 12 integrally extends inward horizontally. Stationary member 11 has an inner circumferential face 11*a* with a lower part at the vertical center, from which circular lower flange 13 integrally extend inward horizontally. Inner circumferential face 11*a* and bottom face 13*b* of lower flange 13 define a lower space A1 therebetween. Within the space A1, a contact mounting member 14 is housed. Mounting member 14 is mounted with a pair of sliding contacts 17, 18.

Figure 2:
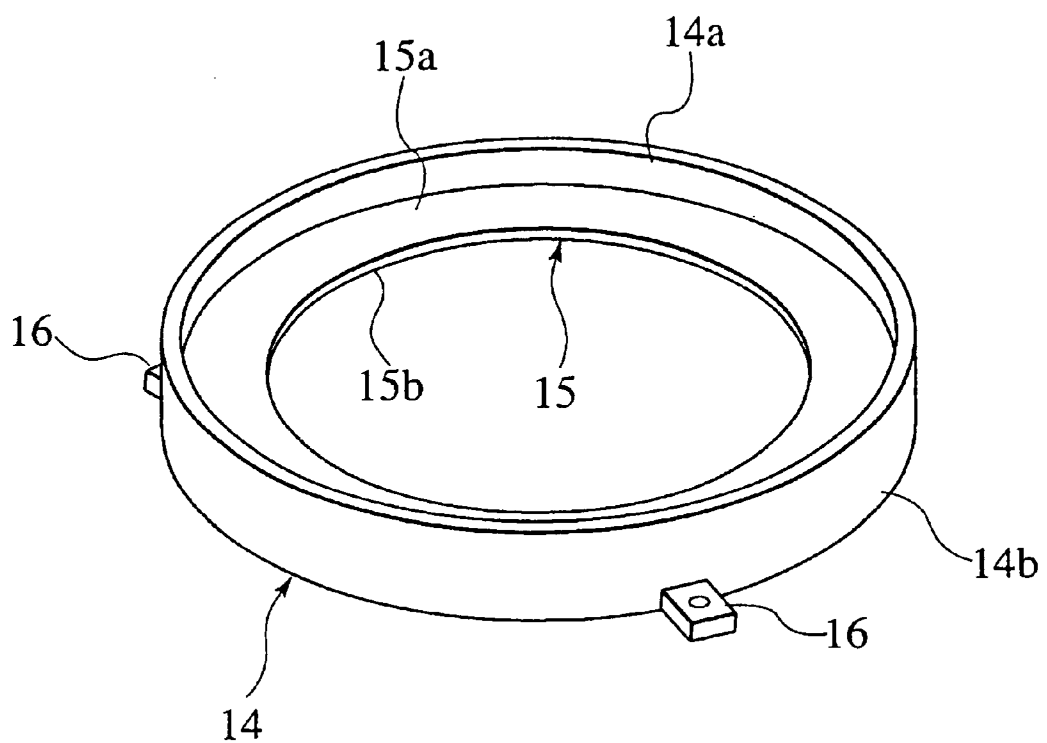
FIG. 2 is a perspective view of a contact mounting member of the slip ring device in FIG. 1.

In FIGS. 1 and 2, mounting member 14 is formed of a synthetic resin into a thin cylindrical shape. Mounting member 14 includes an inner circumferential face 14*a*, which has a circular flanged mounting part 15 at the vertical center. Mounting part 15 extends integrally from face 14*a* inward horizontally. Mounting part 15 includes top face 15*a*, to which one sliding contact 17 of L-shaped in side view is removably mounted, using a fastener such as screws 17*c*. Mounting part 15 includes bottom face 15*b*, to which the other sliding contact 18 of L-shaped in side view is removably mounted, using a fastener such as screws 18*c*. Each of sliding contacts 17, 18 includes a free end, from which convex contact 17*a*, 18*a* projects.

Mounting member 14 includes outer circumferential face 14*b* with a lower part, from which mounting pieces 16 project at intervals. Mounting pieces 16 are housed in recesses 11*b*, each of which are formed on the bottom face of stationary member 11 at equal intervals. Fastening with screws 19 removably mounts mounting member 14 within space Al at the lower part of stationary member 11.

In FIG. 1, rotary member 20 includes a synthetic resin circular upper lid 21. Lid 21 includes a thick cylindrical part 2l*a* radially inside the central portion of the lower part. Rotary member 20 includes synthetic resin circular double cylindrical rotator 22, which is fixed to the bottom face of cylindrical part 21*a*, by some means. Cylindrical part 21*a* includes an outer circumferential side, which is rotatably supported to the inner circumferential face 12*a* of upper flange 12. Rotator 22 includes circular multi-stepped flanged part 23, which projects integrally from rotator 22. Flanged part 23 includes central step 23*a*, which is rotatably supported to the inner circumferential face 13*a* of lower flange 13. Rotary member 20 is rotatably supported to stationary member 11, using a detachment prevention means (not illustrated) for preventing rotary member 20 from being removed.

Figure 3:
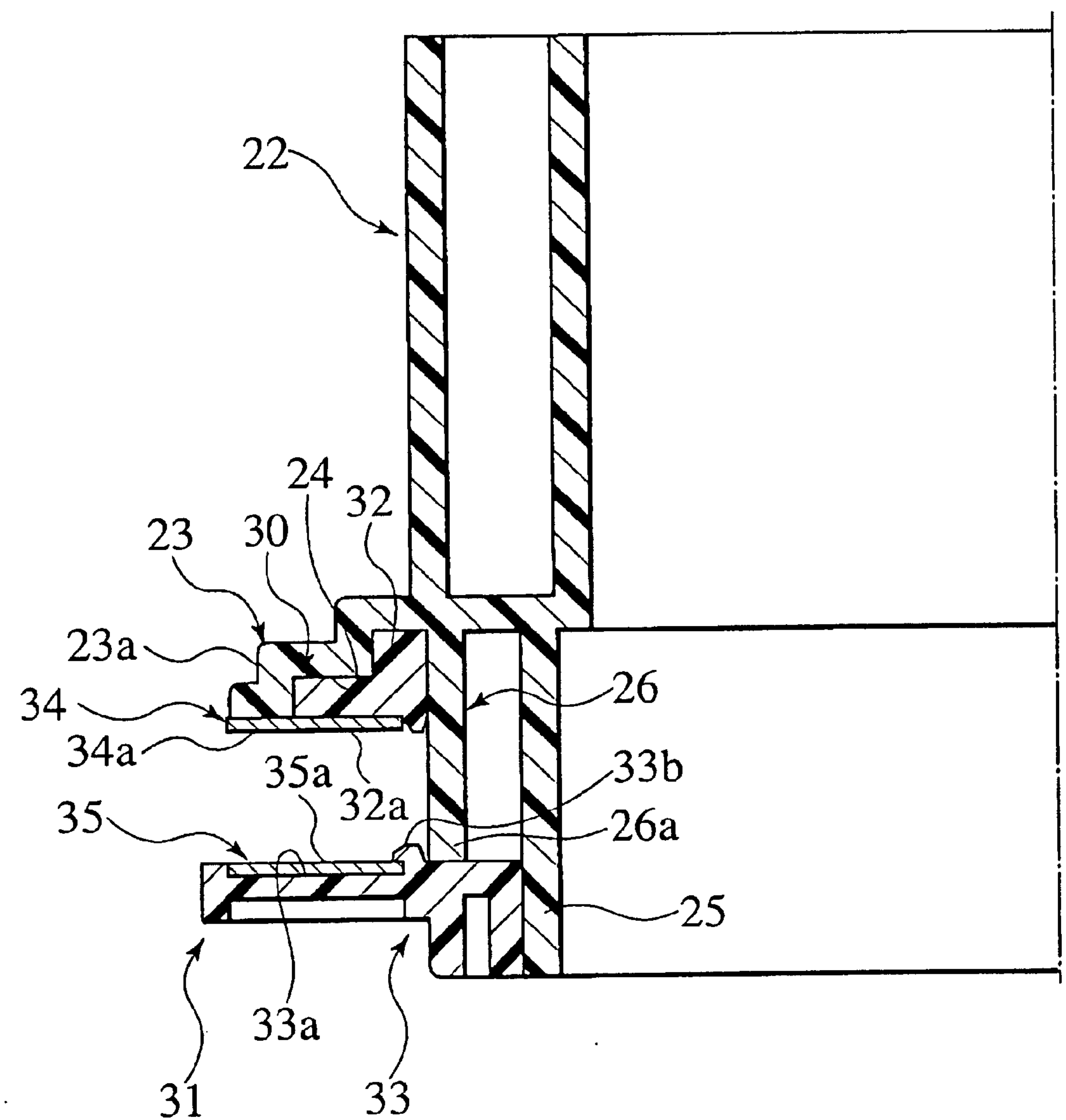
FIG. 3 is an enlarged sectional view of a primary part of the slip ring device in FIG. 1.

In FIG. 3, rotator 22 includes a pair of upper and lower slip rings 30, 31. Slip ring 30 is mounted to the recess 24 at the bottom face of flanged part 23. Slip ring 31 is mounted between a long inner wall 25 and a short outer wall 26 at the lower part of rotator 22. Upper slip ring 30 includes synthetic resin (insulative) circular ring base 32, which is fitted into recess 24 at the bottom face of flanged part 23. Slip ring 30 includes circular plate-shaped conductive ring 34, which is fixed to the bottom face 34*a* of ring base 32 and projects outwardly at length. Conductive ring 34 includes a bottom face as sliding face 34*a*, on which contact 17*a* of upper sliding contact 17 slidably contacts.

In FIGS. 1 and 3, lower slip ring 31 includes an insulative synthetic resin circular plate-shaped ring base 33, and a circular recess 33*a* on the top face. Lower slip ring 31 includes a circular plate-shaped conductive ring 35, which is housed in recess 33*a*. Recess 33*a* includes an edge proximate to the inner circumference, from which a hooked projection (locking part) 33*b* integrally and annularly projects. Projection 33*b* provisionally locks conductive ring 35 in recess 33*a*. When the ring base 33 is fitted into inner wall 25 of rotator 22, the lower end 26*a* (press part) of outer wall 26 presses projection 33*b* toward recess 33*a*. This primary locks conductive ring 35 within recess 33*a*. Conductive ring 35 includes a top face as sliding face 35*a*, on which contact 18*a* of contact 18 slidably contacts. This allows a pair of upper and lower slip rings 30, 31 to be removably mounted to rotator 22, with sliding faces 34*a*, 35*a* of conductive rings 34, 35 facing each other at a distance (height).

Respective sliding contacts 17, 18 include base ends 17*b*, 18*b*, which are connected to connector 40 provided to stationary member 11, using a lead wire (not illustrated). Connector 40 connects a power supply circuit in the steering column. Each of conductive rings 34, 35 connect connector 41 provided to upper lid 41, using a lead wire (not illustrated). Connector 41 connects a heater within the steering wheel. The upper and lower flanges 12, 13 of stationary member 11 and outer wall 26 of rotator 22 surround internal space B1. Space B1 houses a flexible flat cable, not illustrated. Stationary member 11 includes a top face formed with circular grooved recess 11*c*. Upper lid 21 includes cylindrical part 21*b* projecting outward from it, the end of which is inserted into recess 11*c*.

The slip ring device is fabricated as follows. Within space A1 (the narrow lower part between stationary member 11 and rotator 20), a pair of slip ring 30, 31 for two circuits and a pair of contact 17, 18 are mounted. Flange 23 of rotator 22 includes recess 24 at the lower part, in which one slip ring 30 is previously mounted.

Next, mounting member 14, equipped with a pair of contacts 17, 18, is mounted within lower space Al. The recess 33*a* of ring base 33 of the other slip ring 31 houses conductive ring 35. The edge of recess 33*a* proximate to the inner circumference provisionally locks with conductive ring 35, using projection 33*b*. Projection 33*b* fits the slip ring 31 with inner wall 25 of rotator 22. In FIG. 3, the lower end 26*a* of outer wall 26 presses against 33*b*, which primarily locks conductive ring 35 in recess 33*a*. When the lower end 26*b* presses against the backside of projection 33*b*, the space for flexing projection 33*b* inward is lost. Projection 33*b* securely prevents the disengagement of conductive ring 35, which allows for the secure primary locking of conductive ring 35 in the recess 33*a*. This prevents the displacement of conductive ring 35 toward the center of the circle.

According to the embodiment, respective slip rings 30, 31 do not lie on an identical plane, but on two planes facing each other, thus inducing a circuit per plane. The arrangement does not require radial clearance between two circuits as is conventional. This allows a pair of slip rings 30, 31 for two circuits to be arranged in space A1, respectively. The arrangement reduces the radial dimensions of the slip ring device.

The arrangement of contacts 17, 18 between conductive rings 34, 35 allows a pair of sliding contacts 17, 18 for two circuits to be arranged in space A1. This reduces the height dimensions of slip ring device 10, thus further achieving a small-sized and thin-sized entire device.

Conductive ring 35 is securely fixed in recess 33*a* of ring base 33, using projection 33*b* and lower end 26*a* of outer wall 26. This securely prevents the displacement of conductive ring 35 due to the sliding of contact 18.

Mounting member 14 is easily mounted to stationary member 11 with screws 19. Mounting member 14 has a structure with the upper and lower parts opposite to each other relative to mounting part 15. The structure allows common components for contacts 17, 18 and conductive rings 34, 35 to be used for two circuits, thus achieving lower costs.

Pairs of slip rings 30, 31 and contacts 17, 18 allow a large current to be supplied from the steering column to the heater in the steering wheel. This heats the steering wheel, thus providing a vehicle adapted to a cold environment.

In the embodiment, the slip rings may be provided to the stationary member, and the sliding contacts may be provided to the rotary member. The slip ring device is adapted to an electrically conductive device (that is, a clock spring) between the steering column and the steering wheel. However, the member to be mounted is not limited to being between the steering column and wheel.

Second Embodiment

Figure 4:
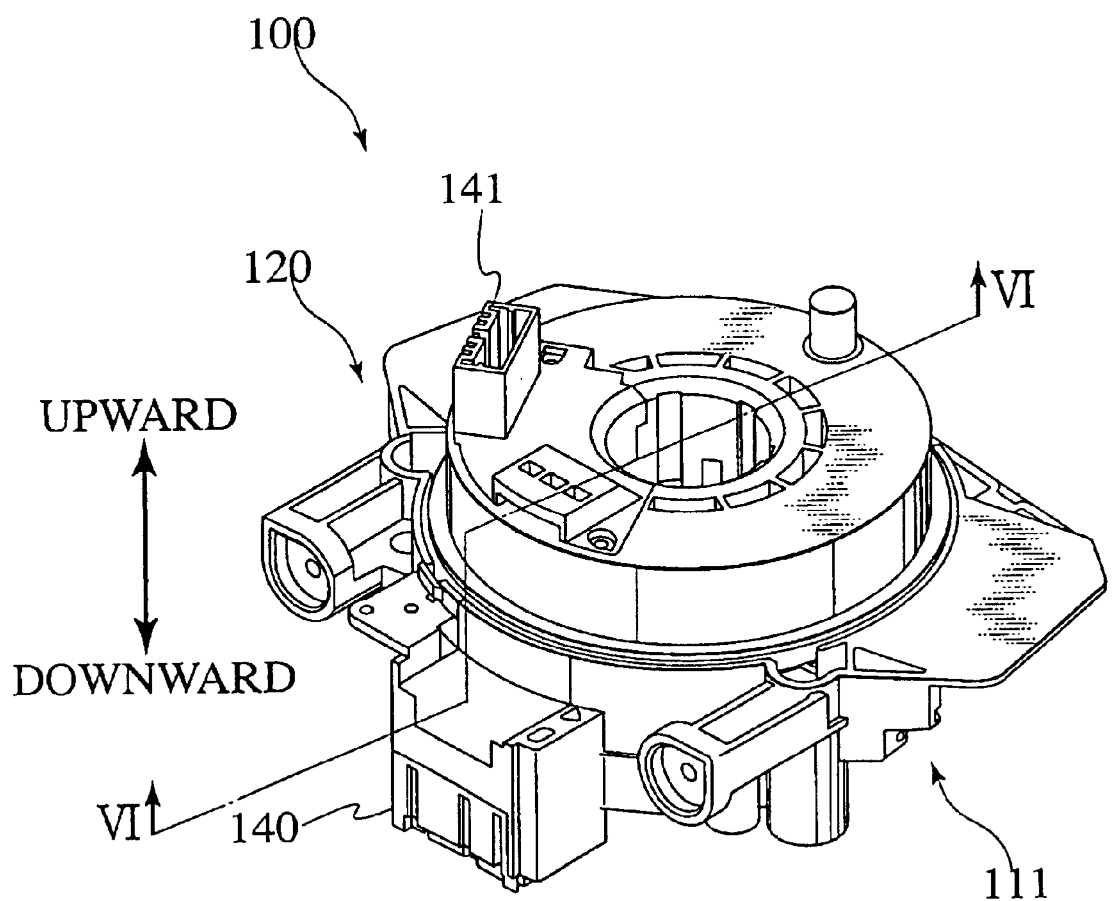
FIG. 4 is an exterior view of the second embodiment according to a slip ring device of the invention.

As shown in FIG. 4, slip-ring device 100 includes an insulative stationary member 111, which is mounted to, for example, a steering column of a vehicle. Device 100 includes an insulative rotary member 120 mounted to a steering wheel. Rotary member 120 is rotatable relative to stationary member 110 .

Figure 5:
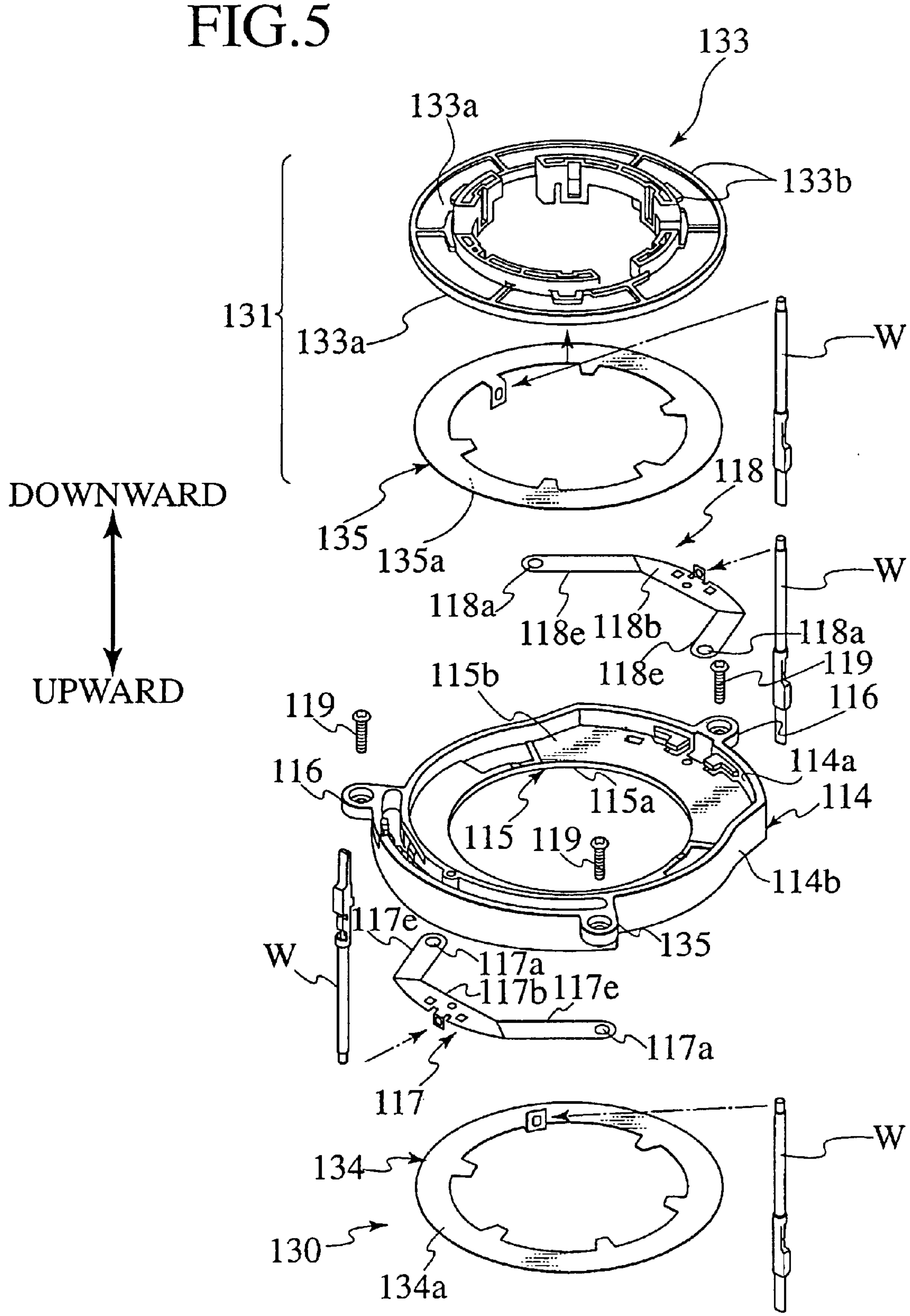
FIG. 5 is an exploded view of a primary part of the slip ring device in FIG. 4.

As shown in FIG. 5, slip-ring device 100 includes a pair of slip rings 130, 131 mounted to rotary member 120, with respective sliding faces 134*a*, 135*a*. Stationary member 111 includes a pair of sliding contacts 117, 118, each of which slidably contact with each of sliding faces 134*a*, 135*a*. The sliding contact establishes electrical connection between stationary member 110 and rotary member 120.

Figure 6:
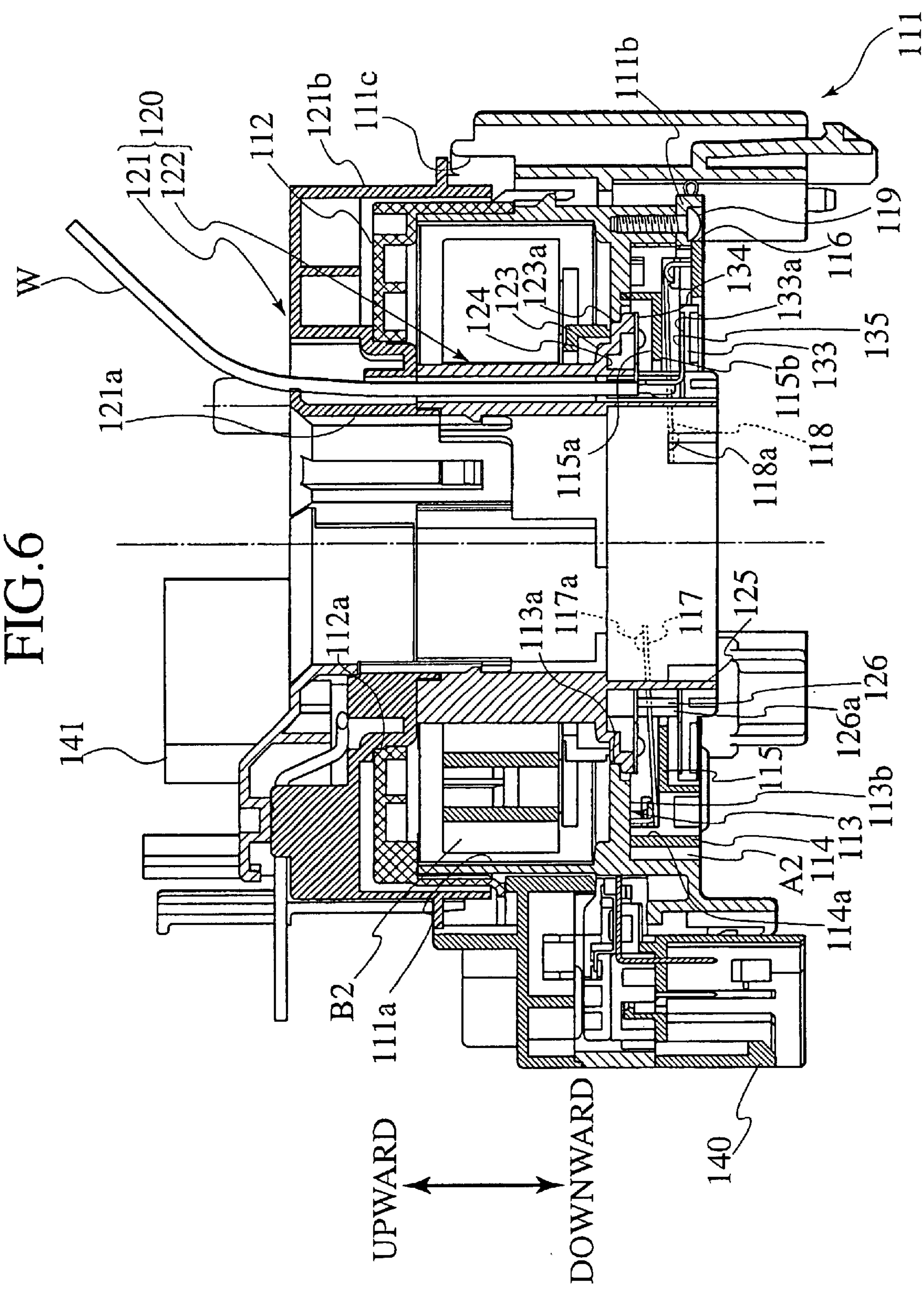
FIG. 6 is a sectional view taken along VI—VI line in FIG. 4.

In FIG. 6, a synthetic resin cylindrically shaped stationary member 111 has an upper end, from which circular upper flange 112 integrally extends inward horizontally. Stationary member 111 has an inner circumferential face 111*a* with a lower part, from which circular lower flange 113 integrally extend inward horizontally. Inner circumferential face 111*a* and bottom face 113*b* of lower flange 113 define a lower space A2 therebetween. Within the space A2, contact mounting member 114 is housed. Mounting member 114 is mounted with a pair of sliding contacts 117, 118.

In FIG. 6, rotary member 120 includes circular upper lid 121 with an inner edge. Lid 121 includes cylindrical part 121*a*, which extends downward from the inner edge. Rotary member 120 includes double cylindrical rotator 122, which is fixed to the bottom face of cylindrical part 121*a*. Cylindrical part 121*a* includes an outer circumference, which is rotatably supported to the inner circumference (side) 112*a* of upper flange 112. Rotator 122 includes circular multi-stepped flanged part 123, which projects radially outward from rotator 122.

Flanged part 123 includes central step 123*a*, which is rotatably supported to inner circumferential face 113*a* of lower flange 113. Rotary member 120 is rotatably supported to stationary member 111, using detachment prevention means (not illustrated) for preventing rotary member 20 from being removed from stationary member.

The upper and lower flanges 112, 113 of stationary member 111 and outer wall 126 of rotator 122 surround internal space B2. Space B2 houses a flexible flat cable, not illustrated. Stationary member 111 includes a top face formed with circular grooved recess 111*c*. Upper lid 121 includes cylindrical part 121*b* projecting outward from it, the end of which is inserted into recess 111*c*.

In FIGS. 5 and 6, mounting member 114 is formed of a synthetic resin into a thin cylindrical shape. Mounting member 114 includes inner circumferential face 114*a*, which has a circular flanged mounting part 115 at its vertical center. Mounting part 115 extends inward from face 114*a*. Mounting part 115 includes top face 115*a*, to which U-shaped one sliding contact 117 is removably mounted, using a fastener. Mounting part 115 includes bottom face 115*b*, to which U-shaped the other sliding contact 118 is removably mounted, using a fastener. Each sliding contacts 117, 118 includes base end 117*b*, 118*b* with free ends 117*e*, 118*e*. Each free ends 117*e*, 118*e* extend from base 117*b*, 118*b* at an obtuse angle. Each free ends 117*e*, 118*e* have a convex contact 117*a*, 118*a*, which projects from free end 117*e*, 118*e*.

Mounting member 114 includes an outer circumferential wall 114*b* with a top end, from which mounting pieces 116 project outward. Mounting pieces 116 are fixed into recesses 111*b* on the bottom face of stationary member 111. Fastening with screws 119 removably mounts mounting member 114 within space A2 of the lower part of stationary member 111.

In FIG. 5, rotator 122 includes a pair of upper and lower slip rings 130, 131. Slip ring 130 is mounted to recess 124 at the bottom face of flanged part 123. Slip ring 131 is mounted to inner wall 125 at the bottom of rotator 122. Slip ring 130 includes circular plate-shaped conductive ring 134, which is fixed to the bottom of flanged part 123 and projects outward at length. Conductive ring 134 includes a bottom face as sliding face 134*a*, with which contact 117*a* of upper sliding contact 117 slidably contacts.

FIGS. 4 and 6, lower slip ring 131 includes an insulative synthetic resin circular plate-shaped ring base 133, and circular recess 133*a* on the top face. Lower slip ring 131 includes circular plate-shaped conductive ring 135, which is housed in recess 133*a*. Recess 133*a* includes an edge proximate to the inner circumference, from which hooked projection (locking part) 133*b* projects annularly. Projection 133*b* provisionally locks conductive ring 135 in recess 133*a*. When the ring base 133 is fitted into inner wall 125 of rotator 122, the lower end 126*a* (press part) of outer wall 126 presses projection 133*b* toward recess 133*a*. This primary locks conductive ring 135 within recess 133*a*. Conductive ring 135 includes a top face as sliding face 135*a*, on which contact 118*a* of contact 118 slidably contacts. This allows a pair of upper and lower slip rings 130, 131 to be removably mounted to rotator 122, with sliding faces 134*a*, 135*a* facing each other at a distance (height).

Respective sliding contact 117, 118 include base ends 117*b*, 118*b*, which are connected to connector 140 provided to stationary member 111, using a lead wire W. Connector 140 connects a power supply circuit of the steering column, using a flexible flat cable (FFC). Each of conductive rings 134,135 connect connector 141 provided to upper lid 141, using a lead wire W. Connector 141 connects a heater within the steering wheel, using an FFC. The upper and lower flanges 112, 113 of stationary member 111 and outer wall 126 of rotator 122 surrounds internal space B1

The slip ring device 100 is fabricated as follows. Within space A2, a pair of slip rings 130, 131 for two circuits and a pair of contacts 117, 118 are mounted. Flange 123 of rotator 122 includes a recess 124 at the lower part, in which conductive ring 134 is previously mounted.

Next, mounting member 114, equipped with a pair of contacts 117, 118, is mounted within lower space A2. The recess 133*a* of ring base 133 of the other slip ring 131 houses conductive ring 135. The edge of the recess 133*a* proximate to the inner circumference provisionally locks with conductive ring 135, using projection 133*b*. Projection 133*b* fits the slip ring 131 with inner wall 125 of rotator 122. In FIG. 6, the lower end 126*a* of outer wall 126 presses against 133*b*, which primarily locks conductive ring 135 in recess 133*a*.

The embodiment obtains identical benefits to the first embodiment.

The entire contents of Japanese Patent Applications P2001-348955 (filed Nov. 14, 2002) are incorporated herein by reference.

Although the invention has been described above with reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An electrical connection device comprising:

a stationary member;

a rotary member rotatable relative to the stationary member;

a first conductive member having a first slip face, the first conductive member operably connected to one of the stationary member and the rotary member;

a base member having a recess, the base member operably connected to the same one of the stationary member and the rotary member as the first conductive member;

a second conductive member having a second slip face, the second conductive member disposed in the recess of the base member;

a locking part mounted to the base member for locking the second conductive member into the recess of the base member;

a pressing part integral to one of the stationary member and rotary member for pressing the locking part against the second conductive member; and at least two contact members adapted to contact one of the first and second slip faces, the at least two contact members operably connected to the other of the stationary member and the rotary member as the first conductive member and the base member.

2. The electrical connection device as in claim 1, further including a mounting member disposed between the stationary member and the rotary member with a first and second side opposite to each other, wherein the at least two contact members include a first contact member adapted to contact the first conductive member and a second contact member adapted to contact the second conductive member, the first contact member mounted on the first side of the mounting member and the second contact member mounted on the second side of the mounting member.

3. The electrical connection device as in claim 1, wherein the first and second conductive members are rings.

4. The electrical connection device as in claim 1, wherein the at least two contact members are resilient members.

5. The electrical connection device as in claim 1, wherein the slip face of the second conductive member faces the slip face of the first conductive member.

6. The electrical connection device as in claim 1, wherein the second conductive member is separated from the first conductive member.

7. The electrical connection device as in claim 1, wherein the at least two contact members are axially offset relative to each other.

8. The electrical connection device as in claim 1, wherein the at least two contact members and the first and second conductive members form a portion of at least one circuit electrically interconnecting the stationary member and the rotary member.

9. The electrical connection device as in claim 1, wherein the at least two contact members each have a base, a first free end extending from the base at an obtuse angle relative to the base, a second free end extending from the base at an obtuse angle relative to the base, and a curved contacting portion projecting from the first and second free ends adapted to contact one of the first and second conductive members.

* * * * *